(12) United States Patent
Chen et al.

(10) Patent No.: US 12,361,105 B2
(45) Date of Patent: *Jul. 15, 2025

(54) SIGNATURE VERIFICATION

(71) Applicant: Microsoft Technology Licensing, LLC, Redmond, WA (US)

(72) Inventors: Tianyi Chen, Redmond, WA (US); Sheng Yi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/820,036

(22) Filed: Aug. 16, 2022

(65) Prior Publication Data

US 2022/0392265 A1 Dec. 8, 2022

Related U.S. Application Data

(63) Continuation of application No. 16/665,921, filed on Oct. 28, 2019, now Pat. No. 11,450,150.

(51) Int. Cl.
*G06F 21/32* (2013.01)
*G06F 18/214* (2023.01)
(Continued)

(52) U.S. Cl.
CPC ............ *G06F 21/32* (2013.01); *G06F 18/214* (2023.01); *G06N 3/045* (2023.01); *G06V 10/764* (2022.01);
(Continued)

(58) Field of Classification Search
CPC .. G06V 40/394; G06V 40/376; G06V 40/382; G06F 18/214; G06N 3/045; H04L 9/0866
See application file for complete search history.

(56) References Cited

U.S. PATENT DOCUMENTS 10,152,676 B1 * 12/2018 Strom .................... G06N 3/084
10,810,508 B1 * 10/2020 Maximo ............... G06F 16/906
(Continued)

FOREIGN PATENT DOCUMENTS

CN         110235138 A      9/2019

OTHER PUBLICATIONS

U.S. Appl. No. 16/665,921, filed Oct. 28, 2019.
(Continued)

*Primary Examiner* — Qun Shen
(74) *Attorney, Agent, or Firm* — Weaver IP L.L.C.

(57) ABSTRACT

Methods, systems, and computer program products are provided for signature verification. Signature verification may be provided for target signatures using genuine signatures. A signature verification model pipeline may extract features from a target signature and a genuine signature, encode and submit both to a neural network to generate a similarity score, which may be repeated for each genuine signature. A target signature may be classified as genuine, for example, when one or more similarity scores exceed a genuine threshold. A signature verification model may be updated or calibrated at any time with new genuine signatures. A signature verification model may be implemented with multiple trainable neural networks (e.g., for feature extraction, transformation, encoding, and/or classification).

20 Claims, 7 Drawing Sheets

(51) Int. Cl.
*G06N 3/045* (2023.01)
*G06V 10/764* (2022.01)
*G06V 10/80* (2022.01)
*G06V 10/82* (2022.01)
*G06V 40/30* (2022.01)
*H04L 9/08* (2006.01)

(52) U.S. Cl.
CPC ............ *G06V 10/806* (2022.01); *G06V 10/82* (2022.01); *G06V 40/33* (2022.01); *G06V 40/376* (2022.01); *G06V 40/382* (2022.01); *G06V 40/394* (2022.01); *H04L 9/0866* (2013.01)

(56) References Cited

U.S. PATENT DOCUMENTS

| | | | | |
|---|---|---|---|---|
| 2005/0220185 | A1* | 10/2005 | Dowling | H04L 25/03057 375/232 |
| 2013/0173632 | A1* | 7/2013 | Birdwell | G06F 16/2246 707/743 |
| 2014/0119615 | A1* | 5/2014 | Mercolino | G06K 19/10 382/112 |
| 2017/0024855 | A1* | 1/2017 | Liang | G06T 3/4053 |
| 2017/0148467 | A1* | 5/2017 | Franklin | G10L 25/39 |
| 2019/0026466 | A1* | 1/2019 | Krasser | G06N 7/01 |
| 2019/0050727 | A1* | 2/2019 | Anderson | G06N 3/08 |
| 2019/0130275 | A1* | 5/2019 | Chen | G06N 3/047 |
| 2020/0160173 | A1* | 5/2020 | Pandey | G06F 18/217 |
| 2020/0184106 | A1* | 6/2020 | Santana de Oliveira | G06F 21/6254 |
| 2020/0410090 | A1* | 12/2020 | Baker | G06N 20/20 |
| 2021/0150779 | A1* | 5/2021 | Anastasio | A61B 5/7267 |

OTHER PUBLICATIONS

Communication pursuant to Article 94(3) Received for European Application No. 20797954.3, mailed on Jan. 8, 2025, 09 Pages.

Lai, et al., "Online Signature Verification using Recurrent Neural Network and Length-normalized Path Signature Descriptor", arXiv:1705.06849v1, May 19, 2017, pp. 1-6.

First Examination Report Received for India Application No. 202247020346, mailed on Mar. 18, 2025, 7 pages.

First Office Action Received for Chinese Application No. 202080075720.8, mailed on Apr. 30, 2025, 08 pages (English Translation Provided).

* cited by examiner

SIGNATURE VERIFICATION

CROSS-REFERENCE TO RELATED APPLICATIONS

This application is a continuation of and claims the benefit of U.S. application Ser. No. 16/665,921, filed on Oct. 28, 2019, titled "Signature Verification", now patented as U.S. Pat. No. 11,450,150, which is incorporated by reference herein in its entirety.

BACKGROUND

Digital signatures (e.g., by finger or stylus pen applied to a capturing surface) may be collected from people for many types of transactions. The identity of a user is usually confirmed based on physical description information (e.g., appearance, identification cards) or possession of personal information, such as passwords.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for signature verification. Signature verification may be provided for target signatures using (e.g., only) genuine signatures. A signature verification model pipeline may extract (e.g., signature stroke geometry and temporal) features from a target signature and a genuine signature, encode and submit both to a neural network to generate a similarity score, which may be repeated for each genuine signature. A target signature may be classified as genuine, for example, when one or more similarity scores exceed a genuine threshold. A signature verification model may be updated or calibrated at any time with new genuine signatures. A signature verification model may be implemented with multiple trainable neural networks (e.g., for feature extraction, transformation, encoding, and/or classification).

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
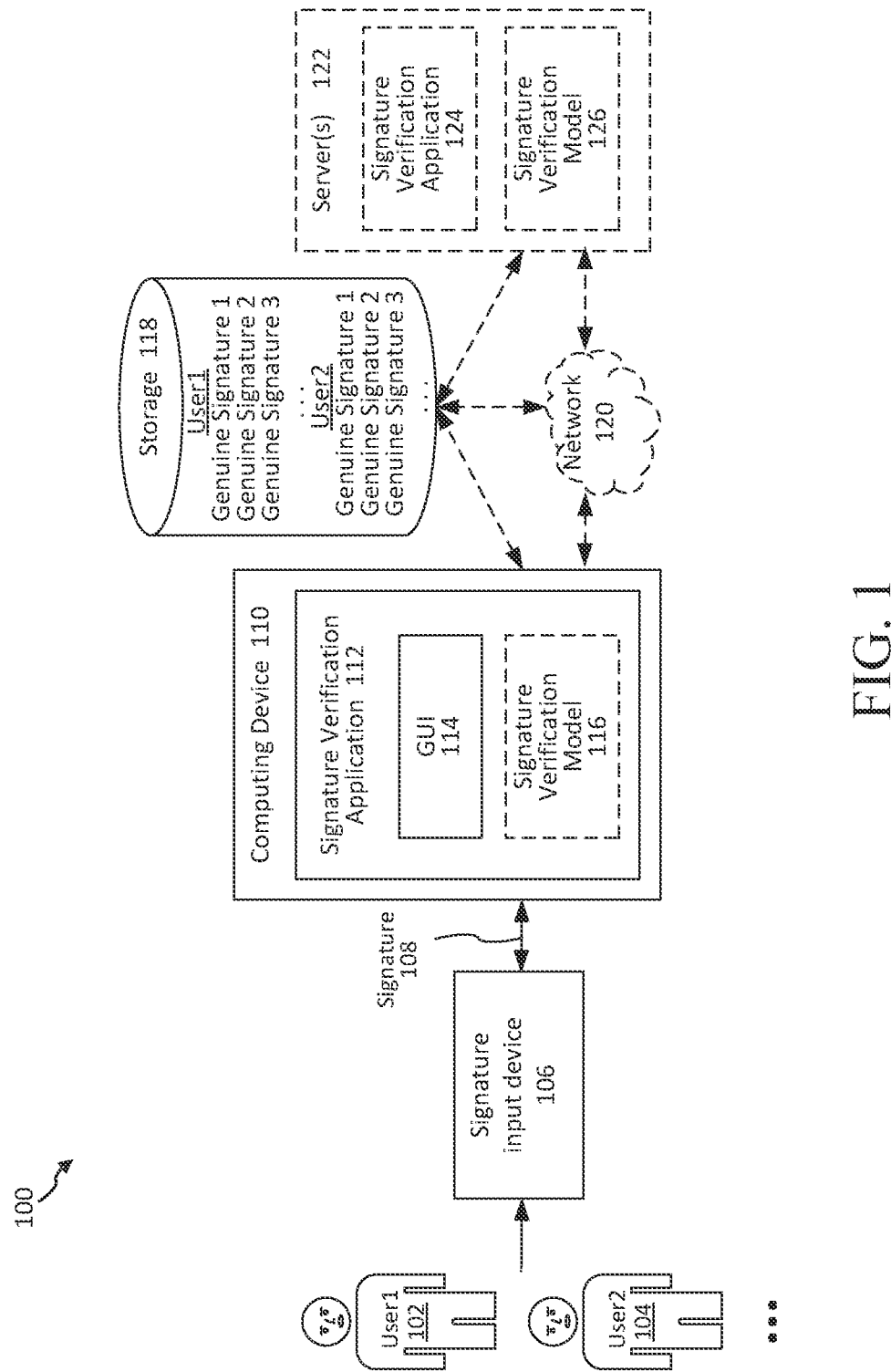
FIG. 1 shows a block diagram of a signature verification system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Digital signatures may be verified, for example, to confirm identity. Signatures may vary from one to the next. Intrapersonal signature variation (i.e., variation between a person's own signatures) may be caused, for example, by whether a person is in a hurry, whether an instrument is being used, the shape or style of an instrument, the shape, size and angle of a digital sample pad, variations in the way a person writes their own signature, etc. Forgers may mimic signature strokes, leaving little interpersonal variation (i.e., variation between different persons writing the same signature) to distinguish. Signature verification models may be trained on genuine and forged signatures to learn to distinguish. Other signature verification models may be trained on only genuine signatures. Some models may be calibrated after initial training (e.g., using additional genuine signatures), while others may not.

Accordingly, methods, systems, and computer program products are provided for improved signature verification. Signature verification may be provided for target signatures using (e.g., only) genuine signatures. A signature verification model pipeline may extract features (e.g., signature stroke geometries and/or temporal features) from a target signature and a genuine signature, encode and submit both to a neural network to generate a similarity score, which may be repeated for each genuine signature. A target signature may be classified as genuine, for example, when one or more similarity scores exceed a genuine threshold. A signature verification model may be updated or calibrated at any time with new genuine signatures. A signature verification model may be implemented with multiple trainable neural networks (e.g., for feature extraction, transformation, encoding, and/or classification). Signature verification may be implemented in various environments with various components and various processes. Some of many possible examples are shown and described herein.

For instance, FIG. 1 shows a block diagram of a signature verification system, according to an example embodiment. As shown in FIG. 1, system 100 may include a computing device 110, one or more server(s) 122, and storage 118, which may be communicatively coupled, for example, by network 120. Computing device 110 includes a signature verification application 112, which includes a graphical user interface (GUI) 114 and a signature verification model 116. Server(s) 122 include a signature verification application 124 and a signature verification model 126. FIG. 1 presents several of many computing environments that may implement subject matter described herein. As indicated by dashed lines, in various implementations, network 120 and/or server(s) 122 may or may not be part of a verification system, which may, for example, impact the location of signature verification model 116/124 and storage 118.

Users may be people who provide signatures for one or more purposes, such as identification in a confirmation or authorization procedure. Example system 100 may be interacted with by multiple users, such as user1 102 and user2 104. In various implementations, there may be one or more (e.g., tens, hundreds, thousands, millions of) users providing signatures via one or more (e.g., tens, hundreds, thousands, millions of) signature input devices.

Signature input device 106 may comprise any of a wide variety of input devices in a wide variety of settings. Computing device 110 and signature input device 106 may be implemented at any (e.g., fixed or mobile) location for any purpose, such as, for example, any business (e.g., bank, merchant, law firm), government entity (e.g., post office), residence (e.g., a user requiring a signature to log into a computer), etc. In an example, computing device 110 and signature input device 106 may be integrated, for example, in a touch screen computing device (e.g., tablet, cellular phone, self-checkout register, credit card terminal).

Computing device 110 may comprise any computing device. Computing device 110 may be, for example, any type of stationary or mobile, wired or wireless, computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 110 may comprise one or more applications, operating systems, virtual machines, storage devices, etc. that may be executed, hosted, and/or stored therein or via one or more other (e.g., networked) computing devices. In an example, computing device 110 may access one or more server computing devices (e.g., over a network). An example computing device with example features is presented in FIG. 8, which is described in detail below.

Computing device 110 may execute one or more applications, such as signature verification application 112. In an example, signature verification application 112 may be provided by or accessed via server(s) 122, e.g., as a web application implemented within a browser application window on computing device 110. Signature verification application 112 may be configured to communicate with one or more input devices (e.g., signature input device 106). Signature input device 106 may provide a display and a sensor to receive and sample signature input provided by user1 102, user2 104, etc. Signature verification application 112 may control signature input device 106 to display to a signor, for example, messages, prompts and/or feedback (e.g., signature as signor provides signature). Signature verification application 112 may receive sampled input signature 108 from signature input device 106. Signature verification application 112 may clear signature input device, for example, after receiving signature 108.

Signature verification application 112 may comprise GUI for various purposes, including to permit interaction with signature verification application 112 by users. In an example, a user that receives signatures (e.g., bank personnel, credit card merchant, government employee, home user) from signature input device 112 may view the signature, control what signature verification application 112 does with the signature (e.g., save it as a genuine signature for an authorized or known user, calibrate the model with one or more genuine signatures, test the model by classifying the signature as genuine or a forgery), view classification results, calibrate signature verification model 116, view and compare target signatures to genuine signatures (e.g., from storage 118), etc.

Signature verification application 112 may comprise signature verification model 116. Signature verification model 116 may receive (e.g., from signature input device 108 and signature verification application 112) a target signature (e.g., signature 108 purportedly from user1 102) and a plurality of genuine signatures (e.g., from storage 118) known to be from user1. Signature verification model 116 may classify the target signature (e.g., signature 108) as genuine or forged based on similarities (or lack thereof) with the plurality of genuine signatures. Signature verification model 116 may comprise a trainable model. Signature verification model 116 may comprise one or more (e.g., trainable) neural networks. Signature verification model 116 may be trained, for example, using genuine signatures. Signature verification model 116 may be calibrated after training, for example, using additional genuine signatures. Additional signatures may be provided, for example, by an authorized user providing additional signatures (e.g., signature 108) through signature input device 106 and by instructing signature verification application 112 to accept signatures (e.g., signature 108) as genuine signatures and to calibrate the model using the additional genuine signatures, which may be stored in storage 118.

Storage 118 may comprise one or more storage devices, which may be local and/or remote (e.g., accessed via network 120). Storage 118 may comprise, for example, internal or external storage for computing device 110, internal or external storage for server(s) 122, network storage, etc. Storage 118 may store user information (e.g., authorized user data, genuine signatures and/or other identifying information). User information may be stored in storage 118 in any format, such as encrypted signatures or signature features indexed by user, etc. In an example, storage 118 may store multiple genuine signatures for multiple (e.g., tens, hundreds, thousands, millions, tens of millions) users. In an example, signature verification application 112 and/or 124 may access storage 118 to store and retrieve information related to users (e.g., user1 102, user2 104), their signatures (e.g., genuine signatures for each user), signature verification application 112, signature verification model 116, etc.

Network 120 may include, for example, any of a local area network (LAN), a wide area network (WAN), a personal area network (PAN), a combination of communication networks, such as the Internet, and/or a virtual network. In example implementations, computing device 110 and server(s) 122 may be communicatively coupled via network 120. Server(s) 122 and computing device 110 may each include at least one network interface that enables communications over network 120. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described below.

Server(s) 122 may comprise one or more servers, such as one or more application servers, database servers, authentication servers, etc. Server(s) 122 may support interaction with computing device 110 and storage 118. Server(s) 122 may serve data (e.g., genuine signatures for one or more users) and/or programs (e.g., signature verification application 112 and/or signature verification model 116) to computing device 110. Server(s) 122 may, for example, provide application programming interfaces (APIs) for signature verification application 112 to interact with storage 130. Server(s) 122 may manage storing, processing, securing and retrieving data in storage 118. Server(s) 122 may comprise, for example, a database engine or management system (DBMS), such as when storage 118 comprises a database. An example of a database server is Microsoft Azure SQL Server.

Server(s) 122 may, for example, provide a cloud user authorization and/or signature verification service. Server(s) 122 may provide signature verification services for multiple (e.g., tens, hundreds, thousands, millions of) entities with multiple (e.g., tens, hundreds, thousands, millions of) signature input devices 106 for multiple (e.g., tens, hundreds, thousands, millions of) users. In an example, server(s) 122 may execute signature verification application 112 and/or signature verification model 124. Server(s) 122 may, for example, receive signature 108 from computing device 110 (e.g., via network 120) and purported to be associated with a user. Signature verification application 112 may provide signature 108 (deemed a target signature) and genuine signatures from storage 118 (e.g., for the user purportedly associated with signature 108) to signature verification model 124. Signature verification model 126 may process signature 108 relative to genuine signatures for the purported user and return a classification (e.g., genuine or forgery), for example, with a confidence level, to computing device 110. Signature verification application 112 may display the classification as a result on GUI 114, for example, to a bank employee, government employee, credit card merchant, or another who received signature 108 and awaits acceptance or rejection of the signature.

Figure 2:
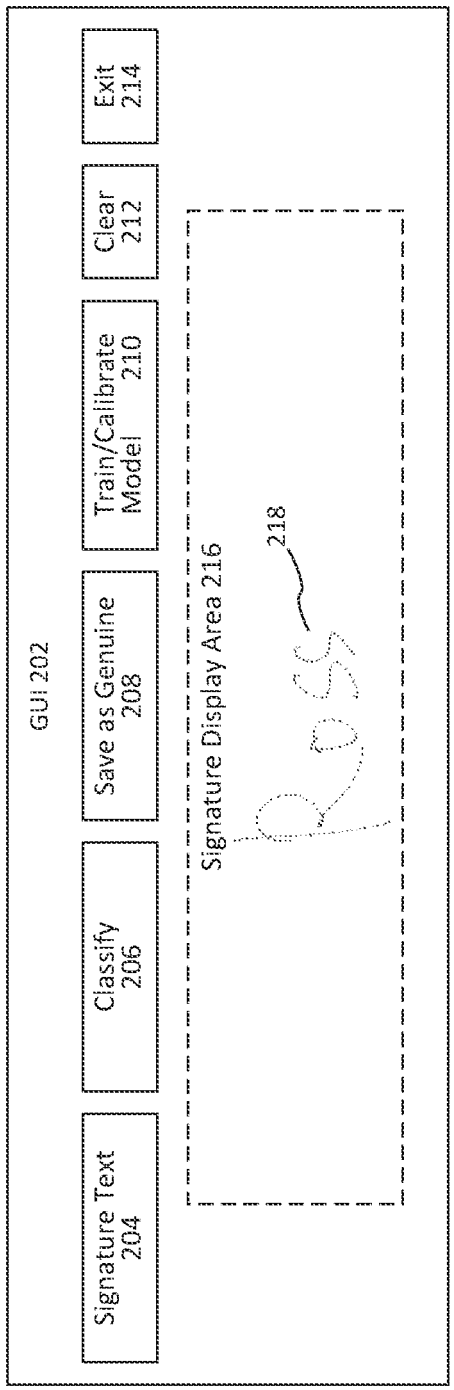
FIG. 2 shows a block diagram of a graphical user interface for a signature verification system, according to an example embodiment.

FIG. 2 shows a block diagram of a graphical user interface (GUI) 200 for a signature verification system, according to an example embodiment. Example GUI 200 shows one of many example implementations of a user interface that may be displayed on a computing device (e.g., computing device 110). In an example (e.g., as shown in FIG. 2), GUI 202 may comprise multiple icons a user may select to control a signature verification application (e.g., signature verification application 112). The illustrated icons are signature text 204, classify 206, save as genuine 208, train/calibrate 210, clear 212, and exit 214. Any combination of these icons, alternative icons, and/or other types of user interface controls may be present in embodiments. The features of GUI 202 are described as follows.

Signature text 204 may be selected, for example, to enter text for a user name being signed. In an example, a user name being signed may be automatically entered, such as following a credit card swipe or a scan of an identification card (e.g., driver's license).

Classify 206 may be selected, for example, to indicate that one or more incoming signatures (e.g., signature 108) should be classified (e.g., as opposed to being entered as a genuine signature). Classify 206 may be selected, for example, to test a signature against genuine signatures. In an example, classification may be automated for one or more implementations, such as in response to a (e.g., programmed) use (e.g., using a signature verification application for credit card authorization).

Save as Genuine 208 may be selected, for example, to indicate that one or more incoming signatures (e.g., signature 108) should be saved as genuine signatures for a user. In an example, a bank may operate a signature verification application that instructs a user to sign his/her name multiple (e.g., 10 or 20) times (e.g., using one or more input devices) to collect a set of genuine signatures that may be used to verify target signatures at other times and/or in different locations (e.g., for credit card use or bank account access).

Train/Calibrate model 210 may be selected, for example, to indicate (e.g., to a signature verification application) that a signature verification model (e.g., signal verification model 116) should be trained or calibrated with all known genuine signatures for a user. In an example, a trained model may be calibrated with one or more additional genuine signatures.

Clear 212 may be selected, for example, to clear sampled signature display area 216 and/or to clear a signature input device (e.g., to prepare to receive a new signature).

Exit 214 may be selected, for example, to exit GUI 202 and/or a signature verification application.

Signature display area 216 may display, for example, a signature input box. Signature display area 216 may display a sampled image of the most recent signature (e.g., Ross 218). In an example, signature display area 216 may match what is displayed on a signature input device.

Figure 3:
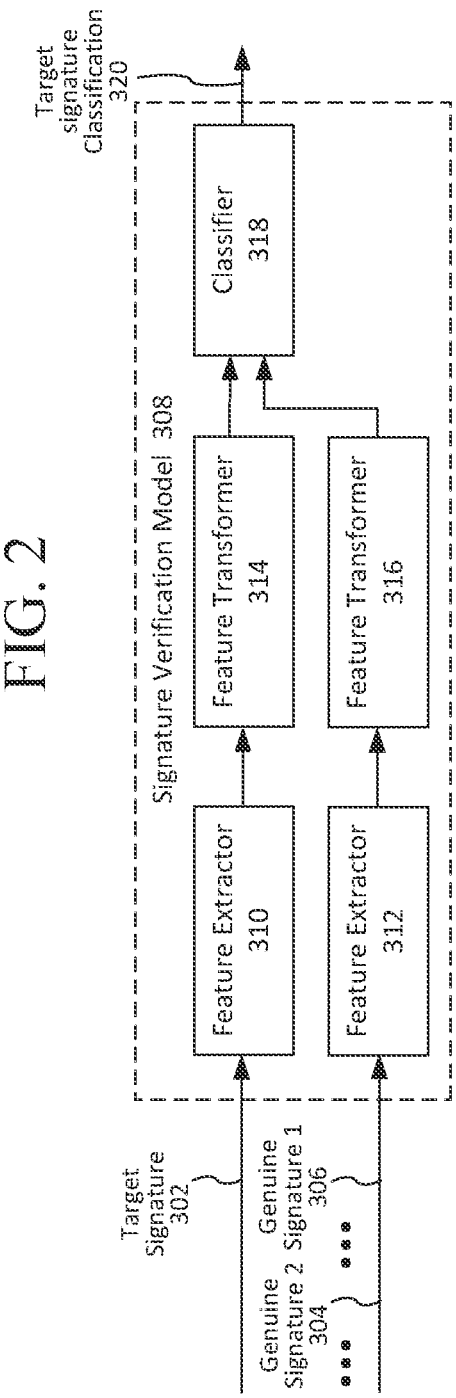
FIG. 3 shows a block diagram of a signature verification model for a signature verification system, according to an example embodiment.

FIG. 3 shows a block diagram of a signature verification model 308 for a signature verification system, according to an example embodiment. Example model 308 shows one of many possible implementations. In an example, signature verification model 308 may comprise an example of signal verification model 116 and/or 126. As shown in FIG. 3, signature verification model 308 includes a first feature extractor 310, a second feature extractor 312, a first feature transformer 314, a second feature transformer 316, and a classifier 318. Signature verification model 308 may receive, for example, target signature 302 and a plurality of genuine signatures (e.g., genuine signature 1 306, genuine signature 2 304, etc.). Signature verification model 308 may generate target signature classification 318. Signature verification model 308 may classify target signature 302 based on the plurality of genuine signatures (e.g., genuine signature 1 306, genuine signature 2 304, etc.). Classifications may include, for example, genuine and forgery. Classifications may include or be accompanied by a similarity score, threshold and/or confidence level.

Signature verification model 308 may comprise feature extractor 310, feature transformer 314 and classifier 318. Signature verification model 308 may comprise multiple pipelines to process target and genuine signatures. For example, target signature 302 may be processed by feature extractor 310 and feature transformer 314 while genuine signatures may be processed by feature extractor 312 and feature transformer 316 before classifier 318. In an (e.g., alternative) example, there may be a single pipeline for target signatures. For example, genuine signatures may be stored in pre-processed format, which may be encrypted, to provide to classifier 318.

Feature extractor 310 may extract features from target signature 302. Feature extractor 310 may extract signature data from a signature image. A target signature provided to signature verification model 308 may comprise geometric and temporal information. In an example, a target signature provided to signature verification model 308 may have been sampled at a fixed time interval (e.g., by a signature input device or a signature verification application). Each signature stroke segment between any pair of consecutive sample points may have an equivalent time period. Feature extractor 310 may interpolate a sufficient number of points (e.g., with a smaller time difference between sample points), for example, so that the signature path reconstructed by sample points is smooth. Each sample point may include two-dimensional (e.g., x, y) coordinate and time information. Each segment (comprising information for two consecutive points) may comprise multiple features. Feature extractor 310 may (e.g., by using interpolated points and segments along with associated information) extract multiple features from target signatures. In an example, feature extractor 310 may extract seven geometric features and two temporal features. Feature extractor 310 may be trainable.

Feature extractor 312 may extract features from genuine signatures. Feature extractor 312 may extract signature data from a signature image. A genuine signature provided to signature verification model 308 may comprise geometric and temporal information. In an example, genuine signatures provided to signature verification model 308 may have been sampled at a fixed time interval (e.g., by a signature input device or a signature verification application). Each signature stroke segment between any pair of consecutive sample points may indicate an equivalent time period. Feature extractor 310 may interpolate a sufficient number of points (e.g., with a smaller time difference between sample points), for example, so that the signature path reconstructed by sample points is smooth. Each sample point may include two-dimensional (e.g., x, y) coordinate and time information. Each segment (comprising information for two consecutive points) may comprise multiple features. Feature extractor 312 may (e.g., by using interpolated points and segments along with associated information) extract multiple features from genuine signatures. In an example, feature extractor 312 may extract seven geometric features and two temporal features. Feature extractor 312 may be trainable.

Feature transformer 314 may transform features extracted from target signature 302 for classifier 318. Classifier 318 may be configured for a particular format of features for target signatures. Feature transformer 314 may, for example, convert the output of feature extractor 310 into feature vectors expected by classifier 318. Feature transformer 314 may be trainable. In an example, feature transformer 314 may convert the output of feature extractor 310 from a 3D tensor into an encoded matrix and (e.g., then) an encoded vector to provide as input to classifier 318.

Feature transformer 316 may transform features extracted from genuine signatures (e.g., 306, 304) for classifier 318. Classifier 318 may be configured for a particular format of features for genuine signatures. Feature transformer 316 may, for example, convert the output of feature extractor 312 into feature vectors expected by classifier 318. Feature transformer 316 may be trainable. In an example, feature transformer 316 may convert the output of feature extractor 312 from a 3D tensor into an encoded matrix and (e.g., then) an encoded vector to provide as input to classifier 318.

Classifier 318 may classify target signature 302 as genuine or forged based on processing of an encoded target feature vector from feature transformer 314 and encoded genuine feature vectors from feature transformer 316. Classifier 318 may generate a similarity score for each encoded genuine feature vector from feature transformer 316 relative to encoded target feature vector from feature transformer 314. Classifier 318 may generate target signature classification 320, for example, by comparing each similarity score to a threshold. In an example, a similarity score above a threshold may result in target signature 302 being classified as genuine. Feature transformer 316 may be trainable.

Figure 4:
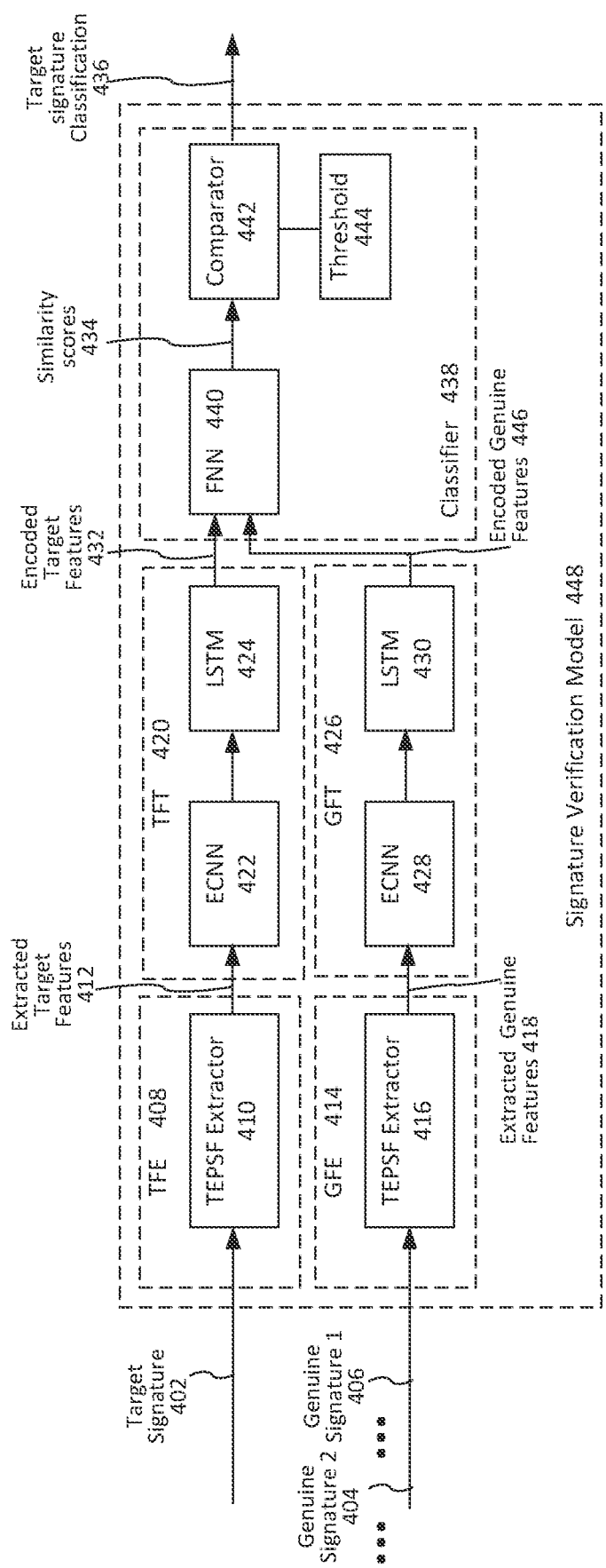
FIG. 4 shows a block diagram of a signature verification model for a signature verification system, according to an example embodiment.

FIG. 4 shows a block diagram of a signature verification model 448 for a signature verification system, according to an example embodiment. Example model 448 shows one of many possible implementations. In an example, signature verification model 448 may comprise an example of signal verification model 116, 126 and/or 308. Signature verification model 448 may receive, for example, target signature 402 and a plurality of genuine signatures (e.g., genuine signature 1 406, genuine signature 2 404, etc.). Signature verification model 448 may generate target signature classification 436. Signature verification model 448 may classify target signature 402 based on the plurality of genuine signatures (e.g., genuine signature 1 406, genuine signature 2 404, etc.). Classifications may include, for example, genuine and forgery. Classifications may include or be accompanied by a similarity score, threshold and/or confidence level.

Signature verification model 448 may comprise a target feature extractor (TFE) 408, a genuine feature extractor (GFE) 414, a target feature transformer (TFT) 420, a genuine feature transformer (GFT) 426 and a classifier 438. Signature verification model 448 may comprise multiple pipelines to process target and genuine signatures. For example, target signature 402 may be processed by TFE 408 and TFT 420 while genuine signatures may be processed by GFE 414 and GFT 426 (e.g., prior to classification by classifier 438). In an alternative embodiment, a single pipeline may be present for target signatures. For example, genuine signatures may be stored in pre-processed format, which may be protected (e.g., by encryption), to provide to classifier 438.

Target feature extractor (TFE) 408 may extract features from target signature 402. TFE 408 may extract signature data from a signature image. A target signature provided to signature verification model 448 may comprise geometric and temporal information. In an example, a target signature provided to signature verification model 448 may have been sampled at a fixed time interval (e.g., by a signature input device or a signature verification application). Each signature stroke segment between any pair of consecutive sample points may indicate an equivalent time period. TFE 408 may interpolate a sufficient number of points (e.g., with a smaller time difference between sample points), for example, so that the signature path reconstructed by sample points is smooth. Each sample point may include two-dimensional (e.g., x, y) coordinate and time information. Each segment (comprising information for two consecutive points) may comprise multiple features. TFE 408 may (e.g., by using interpolated points and segments along with associated information) extract multiple features from target signatures. In an example, TFE 408 may extract seven geometric features and two temporal features. In an example, background pixels may be set at zero. Pixels corresponding to stroke points may be normalized to [−1,1]. TFT 408 may be trainable.

Genuine feature extractor (GFE) 414 may extract features from genuine signatures (e.g., 406, 404, etc.). GFE 414 may extract signature data from a signature image. Genuine signatures provided to signature verification model 448 may each comprise geometric and temporal information. In an example, genuine signatures provided to signature verification model 448 may have been sampled at a fixed time interval (e.g., by a signature input device or a signature verification application). Each signature stroke segment between any pair of consecutive sample points may indicate an equivalent time period. GFE 414 may interpolate a sufficient number of points (e.g., with a smaller time difference between sample points), for example, so that the signature path reconstructed by sample points is smooth. Each sample point may include two-dimensional (e.g., x, y) coordinate and time information. Each segment (comprising information for two consecutive points) may comprise multiple features. GFE 414 may (e.g., by using interpolated points and segments along with associated information) extract multiple features from genuine signatures. In an example, GFE 414 may extract seven geometric features and two temporal features. In an example, background pixels may be set at zero. Pixels corresponding to stroke points may be normalized to [−1,1]. GFE 414 may be trainable.

In an example (e.g., as shown in FIG. 4), TFE 408 may comprise, for example, temporally enhanced path signature feature (TEPSF) extractor 410 while GFE 414 may comprise TEPSF extractor 416. TEPSF extractor 410 may operate similar to (e.g., the same as) TEPSF extractor 416. TEPSF extractors 410, 416 may comprise improved PSF extractors configured to interpolate a sufficient number of stroke points for a smooth path, normalize stroke pixels and background and generate temporal features in addition to geometric and ordering features.

TEPSF extractors 410 and 416 may extract features from a signature, for example, by extracting signature stroke paths/segments and information associated with consecutive stroke points. In an example, a signature image may be saved (e.g., cached) as digital ink. A cached signature image may provide a sequence or set of strokes, each with a series of stroke points and paths or segments between consecutive stroke points.

TEPSF extractors 410 and 416 may interpolate a sufficient number of points (e.g., with a smaller time difference between sample points), for example, so that the signature path reconstructed by sample points is smooth. In an example, background pixels may be set at zero. Pixels corresponding to stroke points may be normalized to [−1,1]. Features may include geometric position, order and timing information for each segment in one or more signature stroke(s).

TEPSF extractors 410 and 416 may, for example, encode each segment into multiple (e.g., nine) 2D matrices. Each matrix may represent a geometric or temporal property of a segment. In an example, seven matrices may represent geometric properties or features for a stroke point or segment while two matrices may represent temporal properties or features for the stroke point or segment.

A signature stroke S may be represented by consecutive points or segments of consecutive points, for example, as provided by Equation 1:

$$S=\{(x_i,y_i,t_i)|i=1,2,\ldots,m\} \quad \text{Equation 1}$$

where $x_i$, $y_i$ are geometric coordinates of each i-th stroke point and $t_i$ is a timestamp for each i-th stroke point, with i ranging from 1 to m. A stroke path segment (connecting two consecutive points) may be given by Equation 2:

$$s_{i,i+1}=\{(x_i,y_i),(x_{i+1},y_{i+1})\} \quad \text{Equation 2}$$

Each stroke path segment between consecutive points may comprise a geometric signature features (e.g., with stroke point ordering) provided, for example, by Equation 3:

$$P^{(0)}_{i,i+1} = 1 \quad \text{Equation 3}$$
$$P^{(1)}_{i,i+1} = (x_{i+1}, y_{i+1}) - (x_i, y_i)$$
$$P^{(2)}_{i,i+1} = \frac{P^{(1)}_{i,i+1} \otimes P^{(1)}_{i,i+1}}{2!}$$

where $\otimes$ represents a Kronecker matrix product. Each stroke path segment may (e.g., further) comprise a temporal signature feature provided, for example, by Equation 4:

$$P_{i,i+1}^{(t)}=\exp(-t_i*\text{scalar}) \quad \text{Equation 4}$$

where the scalar term may be based on a set of genuine signatures used to classify a target signature. In an example, scalar may comprise, for example, 1/1000 (e.g., for genuine signatures in Signature Verification Competition (SVC) 2004 comprising a signature database involving 100 sets of signature data with 20 genuine signatures and 20 skilled forgeries for each set.).

Each matrix in the nine 2D matrices (or nine rank-2 tensors) may represent a geometric property of original stroke points or segments in a signature. The nine matrices representing nine channels for each stroke point or segment may be stacked into a 3D tensor provided, for example, by Equation 5:

$$T_S \in R^{W_s \times 128 \times 9} \qquad \text{Equation 5}$$

where Ws may comprise the width of each matrix, 128 may comprise the height of each matrix and 9 represent the nine channels or features. As indicated by Ws, the width may be variable. Various signatures may vary in height and width. One variable may be fixed while the other variable is scalable to accommodate different sizes of signatures.

Temporally enhanced path signature feature (TEPSF) extractor 410 may output, as extracted target features, a 3D tensor (e.g., as described by Equation 5) given target signature 402. TEPSF extractor 416 may output, as extracted genuine features, a 3D tensor (e.g., as described by Equation 5) for each genuine signature (e.g., genuine signature 1 406, genuine signature 2, 404 and so on). Extracted target features 412 may be provided to target feature transformer (TFT) 420 for transformation(s). Extracted genuine features 418 may be provided to genuine feature transformer (GFT) 426 for transformation(s).

TFT 420 and GFT 426 may (e.g., each) provide transformations that may be necessary for (e.g., configuration compatibility and/or performance of) classifier 438. TFE 408 and GFE 414 may be configured to generate a particular output for extracted target and genuine features 412, 418. Classifier 438 may be configured for a particular input (e.g., encoded target and genuine features 432, 446), which may be incompatible with extracted target and genuine features 412, 418. Accordingly, TFT 420 and GFT 426 may provide necessary transformations for one or more purposes, such as, but not limited to, compatibility, performance optimization, etc. It should be clear that transformations may or may not be required in various implementations and (e.g., when required) may vary between implementations based on feature extraction output and classification input configurations selected for various implementations.

In an example implementation (e.g., as shown in FIG. 4), TFT 420 may comprise, for example, Encoded Convolutional Neural Network (ECNN) 422 and Long Short Term Memory (LSTM) 424. GFT 426 may comprise ECNN 428 and LSTM 430.

ECNN 422 and LSTM 424 may (e.g., each) be trainable neural networks. For example, ECNN 422 and LSTM 424 may (e.g., each) have trainable weights. Similarly, ECNN 428 and LSTM 430 may (e.g., each) be trainable neural networks. For example, ECNN 428 and LSTM 430 may (e.g., each) have trainable weights.

ECNN 422 and ECNN 428 may perform similar (e.g., the same) functions. Accordingly, they may be described together. Similarly, LSTM 424 and LSTM 430 may perform similar (e.g., the same) functions. Accordingly, they may be described together.

ECNN 422 and LSTM 424 may (e.g., collectively) transform extracted target features 412 from a 3D tensor to (e.g., an encoded target feature vector represented by) encoded target features 432. Similarly, ECNN 428 and LSTM 430 may (e.g., collectively) transform extracted genuine features 418 from a 3D tensor to (e.g., an encoded genuine feature vector represented by) encoded genuine features 446. Transformation broadly refers to any processing or manipulation of existing data, creation of new data from existing data and/or combination thereof.

In an example (e.g., as shown in FIG. 4), ECNN 422 and ECNN 428 may, respectively, transform and encode extracted target and genuine features 412 and 418. ECNN 422 and ECNN 428 may (in a first transformation step), for example, transform and encode 3D tensors represented by extracted target and genuine features 412 and 418 into encoded 3D tensors, e.g., as provided by Equation 6:

$$T_{encode} \in R^{W_s/8 \times 1 \times 256} \qquad \text{Equation 6}$$

where $T_{encode}$ may represent an output 3D tensor after CNN extraction of input tensor Ws*128*9, Ws/8 may comprise the (e.g., variable) width of each matrix, 1 may comprise the height of each matrix and 256 may represent the number of channels.

ECNN 422 and ECNN 428 may (e.g., in a second transformation step), for example, transform the encoded 3D tensor in Equation 6 into an encoded 2D matrix, e.g., as provided by Equation 7:

$$M_{encode} \in R^{256 \times W_s/8} \qquad \text{Equation 7}$$

where the 2D encoded matrix $M_{encode}$ may have, for example, 256 (e.g., fixed) rows and Ws/8 (e.g., variable) columns.

The 3D tensor output of TEPSF extractors 410 and 416 may be encoded into 2D matrices, for example, because the task comprises processing sequential data. A neural network may require matrices rather than 3D tensors as input.

In an example (e.g., as shown in FIG. 4), LSTM 424 and LSTM 430 may, respectively, transform each of the target and genuine encoded 2D matrices (generated, respectively, by ECNN 422 and ECNN 428) into encoded vectors represented, respectively, by encoded target and genuine features 432 and 446.

Figure 5:
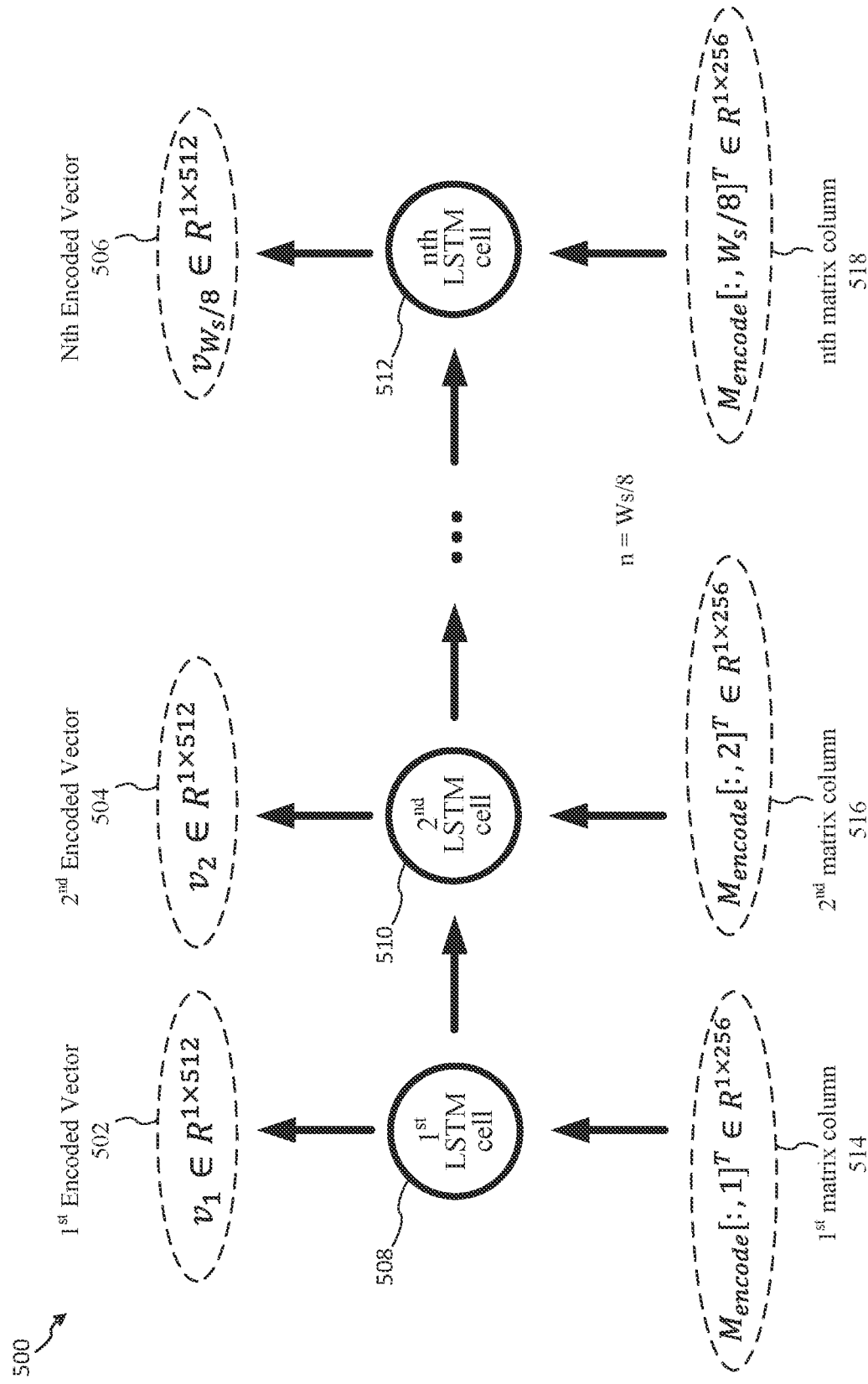
FIG. 5 shows a block diagram of feature transformation, according to an example embodiment.

FIG. 5 shows a block diagram of feature transformation implemented by a LSTM neural network 500, according to an example embodiment. Example LSTM neural network 500 may comprise an example of LSTM 424 and an example of LSTM 430. Example LSTM neural network 500 shows (e.g., at a high level) how the 2D target feature matrix generated by ECNN 422 and the 2D genuine feature matrix generated by ECNN 428 may be transformed into nth encoded target feature vector (represented by encoded target features 432) and nth encoded genuine feature vector (represented by encoded genuine features 446) to be provided as input to classifier 438.

In an example implementation (e.g., with reference to Equation 7), each column of the encoded 2D target feature matrix (generated by ECNN 422) and encoded 2D genuine feature matrix (generated by ECNN 428) may represent one timestamp of input. As indicated by Equation 7, there may be, for example, Ws/8 columns in each matrix in this example.

As shown in FIG. 5, each column of a 2D matrix may be input to a respective LSTM cell. For example, the first matrix column 514 may be input to a first LSTM cell 508, which generates a first encoded vector 502. The second matrix column 516 may be input to a second LSTM cell 510, which generates a second encoded vector 504. This continues through to an nth matrix column 518, which may be input to an nth LSTM cell 518, which generates an nth encoded vector 506. Thus, LSTM 424 and LSTM 430 may, for example, transform columns in the encoded 2D matrix in Equation 7 into a series of encoded vectors, e.g., as provided by Equation 8:

$$M_{encode}[:,1]^T \in R^{1 \times 256} \rightarrow v_1 \in R^{1 \times 512}$$

$$M_{encode}[:,2]^T \in R^{1 \times 256} \rightarrow v_2 \in R^{1 \times 512}$$

$$M_{encode}[:,W_s/8]^T \in R^{1 \times 256} \rightarrow v_{W_s/8} \in R^{1 \times 512} \qquad \text{Equation 8}$$

There may be, for example, a chain of Ws/8 LSTM cells. As indicated in FIG. 5, in this example where the number of LSTM cells may match the number of 2D matrix columns, n cells may be equal to Ws/8 columns. As illustrated in FIG. 5, each LSTM cell may generate an encoded vector dependent on a previous LSTM cell. Each LSTM cell may provide information (e.g. trajectory of previous stroke points) to a subsequent LSTM cell. The nth encoded target feature vector and nth encoded genuine feature vector may be provided as input to classifier 438. These vectors may be the same size. They may be concatenated together into a single long vector.

Classifier 438 may classify target signature 402 as genuine or forged based on similarities between encoded target features 432 generated by TFT 420 and encoded genuine features 446 generated by GFT 426 for each of a plurality of genuine signatures. In the ongoing example presented in FIGS. 4 and 5, encoded target features 432 may comprise the nth encoded vector 506 generated by LSTM 424 while encoded genuine features 446 may comprise the nth encoded vector 506 generated by LSTM 430.

Classifier 438 may comprise, for example, feedforward neural network (FNN) 440 and comparator 442. FNN 440 may generate a set of similarity scores, with each score being based on similarities between the vector comprising encoded target features 432 and the vector comprising encoded genuine features 446. A similarity score may be generated for each vector in the plurality of genuine signature vectors to the target signature vector. Given a signature to be verified and N genuine signatures, there may be N similarities. N similarity scores may be denoted as $S_1$, $S_2$, $S_3$, ..., $S_N$. In an example, a (e.g., each) similarity score generated by FNN 440 may range between zero and one, e.g., Similarity $\in [0, 1]$.

Comparator 442 may classify target signature 402, for example, by comparing each similarity score $S_1$, $S_2$, $S_3$, ..., $S_N$ to one or more (e.g., configurable) thresholds (e.g., threshold 444). Classification may be based on comparing each similarity score $S_1$, $S_2$, $S_3$, ..., $S_N$ to a threshold T (e.g., threshold 444). In an example, target signature 402 may be classified as genuine, for example, when at least one similarity score $S_1$, $S_2$, $S_3$, ..., $S_N$ meets or exceeds a threshold T. Target signature 402 may be classified as forged, for example, when each of the similarity score $S_1$, $S_2$, $S_3$, ..., $S_N$ is below a threshold T. In an example, genuine classification may be given by Equation 9:

$$\max\{S_1, S_2, S_3, \ldots, S_N\} \geq T \quad \text{Equation 9}$$

In an example, a threshold T may be set at 50% or 0.5. In an example, different thresholds may be associated with different genuine signatures.

FNN 440 may be a trainable neural network. For example, FNN 440 may (e.g., each) have trainable weights. Training. Signature verification model 448 may comprise multiple trainable neural networks (e.g., ECNN 422, ECNN 428, LSTM 424, LSTM 430, FNN 440). Signature verification model 448 may be trained, for example, using genuine signatures. Signature verification model 448 may be calibrated after training, for example, using additional genuine signatures.

In an example, a plurality of neural networks (e.g., ECNN 422, ECNN 428, LSTM 424, LSTM 430, FNN 440) may be trained, for example, in multiple iterations. At each iteration of multiple iterations of training, an optimality may be calculated for each neural network. An optimality for each neural network may comprise, for example, a norm of gradient for each of the plurality of trainable neural networks for the iteration of training. The trainable neural network in the plurality of neural networks with the highest calculated optimality for the iteration of training may be selected. The selected neural network may be updated for the iteration of training, e.g., while leaving other neural networks unchanged. Additional iterations may select one or more other neural networks for updates, e.g., while leaving one or more other neural networks unchanged. This type of training may prevent training changes with simultaneous changes to multiple (e.g., all) trainable neural networks that negatively impact performance.

Signature verification model 448 may be used to process signatures with and without timestamped stroke points. For example, TEPSF extractors 410 and 416 may (e.g. also) extract features from signatures stored as images (e.g. without timestamped stroke points). In an example, an image (e.g. an RGB image) may (e.g. essentially) be a 3D tensor (e.g. width*height*3). The output of TEPSF extractors 410 and 416 may comprise a 3D tensor (e.g. width*128*9). An image signature may be rescaled, for example, to a (e.g. one) tensor with height 128. A (e.g. first) convolutional layer of a CNN (e.g. ECNN 422, 428) may, for example, adjust an input tensor with three (e.g. instead of nine) channels.

Signature verification models (e.g. signature verification model 448) may be implemented with or without neural networks. Signature verification models may be implemented with different types of neural networks than those referenced in examples (e.g. ECNN, LSTM and FNN). A signature verification model may comprise, for example, any model with a capability to analyze time sequential data (e.g. Hidden Markov Model).

In an example, TFT 420 and GFT 426 may have a configurable architecture and/or an architecture that may be configured. Table 1 provides an example architecture and configuration of TFT 420 and GFT 426, each comprising a CNN-LSTM model. Table 1 presents input shape in the form of (width, height, channel), kernel shape in the form of (number of kernels, mask, stride) and output shape in the form of (width, height, channel). A stride may be, for example, a single number for width and height stride, or a tuple (sW, sH) representing width and height stride separately.

TABLE 1

Example Architecture and Configuration of TFT and GFT

| Convolutional Layer Or Average Pooling | Input Shape | Kernel Shape | Output Shape | Hidden Size |
|---|---|---|---|---|
| Conv1 | (Ws, 128, 9) | (32, 3, 1) | (Ws, 128, 32) | — |
| AvgPool | (Ws, 128, 32) | (—, 2, 2) | (Ws/2, 64, 32) | — |
| Conv2 | (Ws/2, 64, 32) | (64, 3, 1) | (Ws/2, 64, 64) | — |
| AvgPool | (Ws/2, 64, 64) | (—, 2, 2) | (Ws/4, 32, 64) | — |
| Conv3 | (Ws/4, 32, 64) | (128, 3, 1) | (Ws/4, 32, 128) | — |

TABLE 1-continued

Example Architecture and Configuration of TFT and GFT

| Convolutional Layer Or Average Pooling | Input Shape | Kernel Shape | Output Shape | Hidden Size |
|---|---|---|---|---|
| Conv4 | (Ws/4, 32, 128) | (256, 3, (1, 2)) | (Ws/4, 16, 256) | — |
| AvgPool | (Ws/4, 16, 256) | (—, 2, 2) | (Ws/8, 8, 256) | — |
| Conv5 | (Ws/8, 8, 256) | (128, 3, (1, 2)) | (Ws/8, 4, 128) | — |
| Conv6 | (Ws/8, 4, 128) | (256, 3, (1, 2)) | (Ws/8, 2, 256) | — |
| AvgPool | (Ws/8, 2, 256) | (—, 2, 2) | (Ws/16, 1, 256) | — |
| LSTM | 256 | — | — | 512 |
| FC1 | 1024 | — | — | 512 |
| FC2 | 512 | — | — | 256 |
| FC3 | 256 | — | — | 128 |
| FC4 | 128 | — | — | 1 |

FNN 440 may comprise multiple fully connected (FC) layers (e.g. FC1, FC2, FC3, FC4). ECNNs 422 and 428 may encode a PSF tensor from a 3D tensor to a 2D matrix. Recurrent neural networks (RNNs), such as LSTMs 424, 430, may utilize every column or row of the 2D matrix as input vectors for an RNN (e.g. LSTM) cell. The output vector of the last RNN cell (e.g. Nth encoded vector value $R^{1\times512}$ as shown in FIG. 4) may serve as (e.g. partial) input of FNN 440, which may be formed by stacking several, (e.g. four) FC Layers. FNN 440 calculates a similarity between two signatures. The input size of the first FC layer (FC1) may be (e.g. as shown by example in Table 1), for example, 512*2=1024. The output of the last FC layer (FC4), may be a similarity score between two input signatures.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines. Examples shown and discussed with respect to FIGS. 1-5 may operate, for example, according to example methods presented in FIGS. 6-8.

Figure 6:
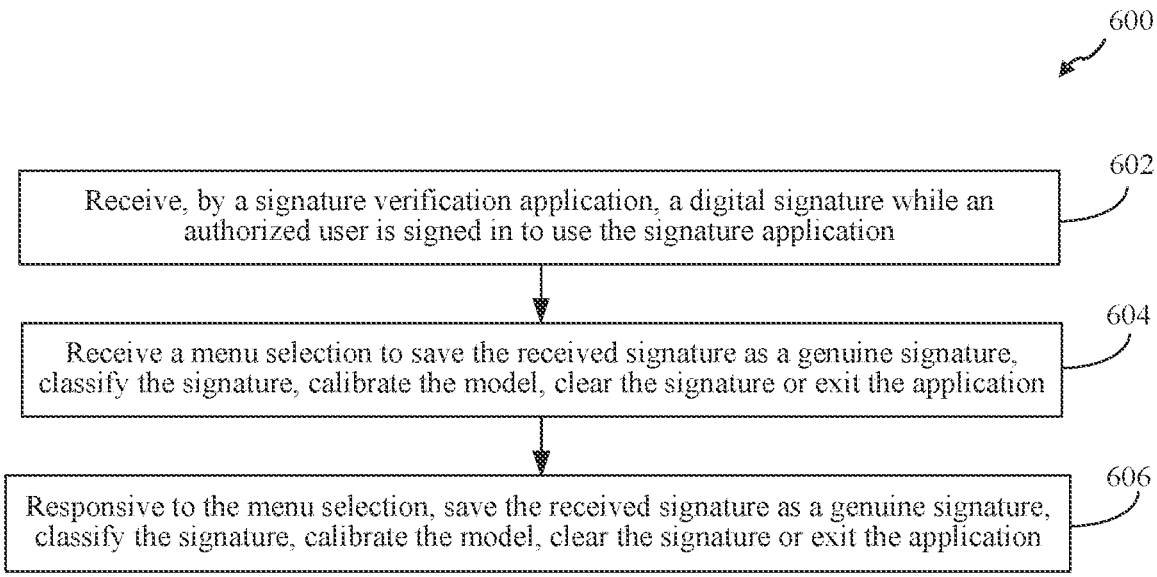
FIG. 6 shows a flowchart of a method for using a graphical user interface for a signature verification system, according to an example embodiment.

Embodiments may also be implemented in processes or methods. For example, FIG. 6 shows a flowchart of a method 600 for using a graphical user interface for a signature verification system, according to an example embodiment. Embodiments disclosed herein and other embodiments may operate in accordance with example method 600. Method 600 comprises steps 602-606. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

Method 600 comprises step 602. In step 602, a signature verification application may receive a digital signature while an authorized user is signed in to use the signature application. For example, as shown in FIG. 1, signature verification application 112 executed by computing device 110 may receive a signature from user 1 102 via signature input device 106.

In step 604, a menu selection may be received to save the received signature as a genuine signature, classify the signature, calibrate the model, clear the signature or exit the application. For example, as shown in FIG. 2, a user of signature verification application 112 may interact with GUI 114/202 to save the received signature as a genuine signature 208, classify the signature 206, calibrate the model 210, clear the signature 212 or exit the application 214.

In step 606, the received signature may, e.g., responsive to the menu selection, a signature may be saved as genuine or classified (e.g., as genuine or forged), a model may be calibrated, the signature may be cleared, or the application may close/exit. For example, as shown in FIGS. 1-5, application 112 may respond to a selection by a user of signature verification application 112 by saving a signature as genuine, classifying the signature, calibrating signature verification model 116, clearing the signature from signature display area 216 and/or signature input device 106 or exiting signature verification application 112.

Figure 7:
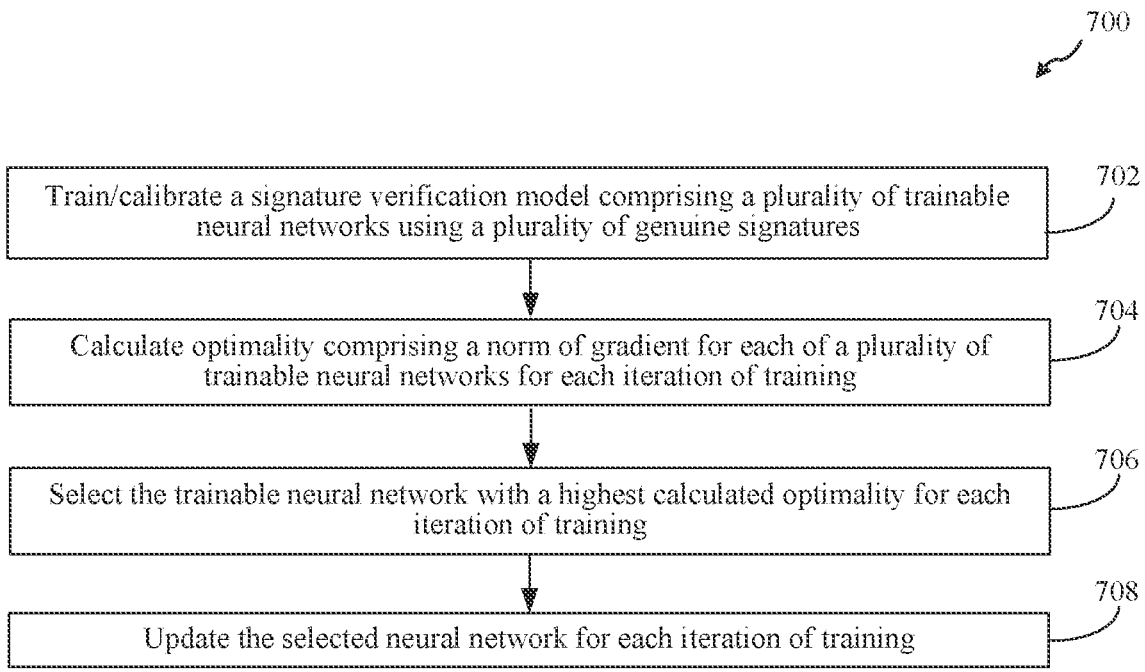
FIG. 7 shows a flowchart of a method for training a signature verification model, according to an example embodiment.

FIG. 7 shows a flowchart of a method 700 for training a signature verification model, according to an example embodiment. Embodiments disclosed herein and other embodiments may operate in accordance with example method 700. Method 700 comprises steps 702-708. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

Method 700 comprises step 702. In step 702, a signature verification model (e.g., comprising a plurality of trainable neural networks) may be trained or calibrated, for example, using a plurality of genuine signatures. For example, as shown in FIG. 1, signature verification model 116 (e.g., comprising a plurality of neural networks ECNN 422, 428, LSTM 424, 430 and FNN 430 as shown in FIG. 4) may be trained using genuine signatures in storage 118.

In step 704, an optimality (e.g., comprising a norm of gradient) may be calculated for each of a plurality of trainable neural networks for each iteration of training. For example, as shown in FIG. 4, an optimality (e.g., comprising a norm of gradient) may be calculated for each of ECNN 422, 428, LSTM 424, 430 and FNN 430 for each iteration of training.

In step 706, the trainable neural network with a highest calculated optimality may be for each iteration of training. For example, as shown in FIG. 4, one or more of neural networks ECNN 422, 428, LSTM 424, 430 and FNN 430 with the highest optimality in a training iteration may be selected.

In step 708, the selected neural network may be updated for the iteration of training. For example, as shown in FIG. 4, one or more of neural networks ECNN 422, 428, LSTM 424, 430 and FNN 430 selected in a training iteration may be updated.

Figure 8:
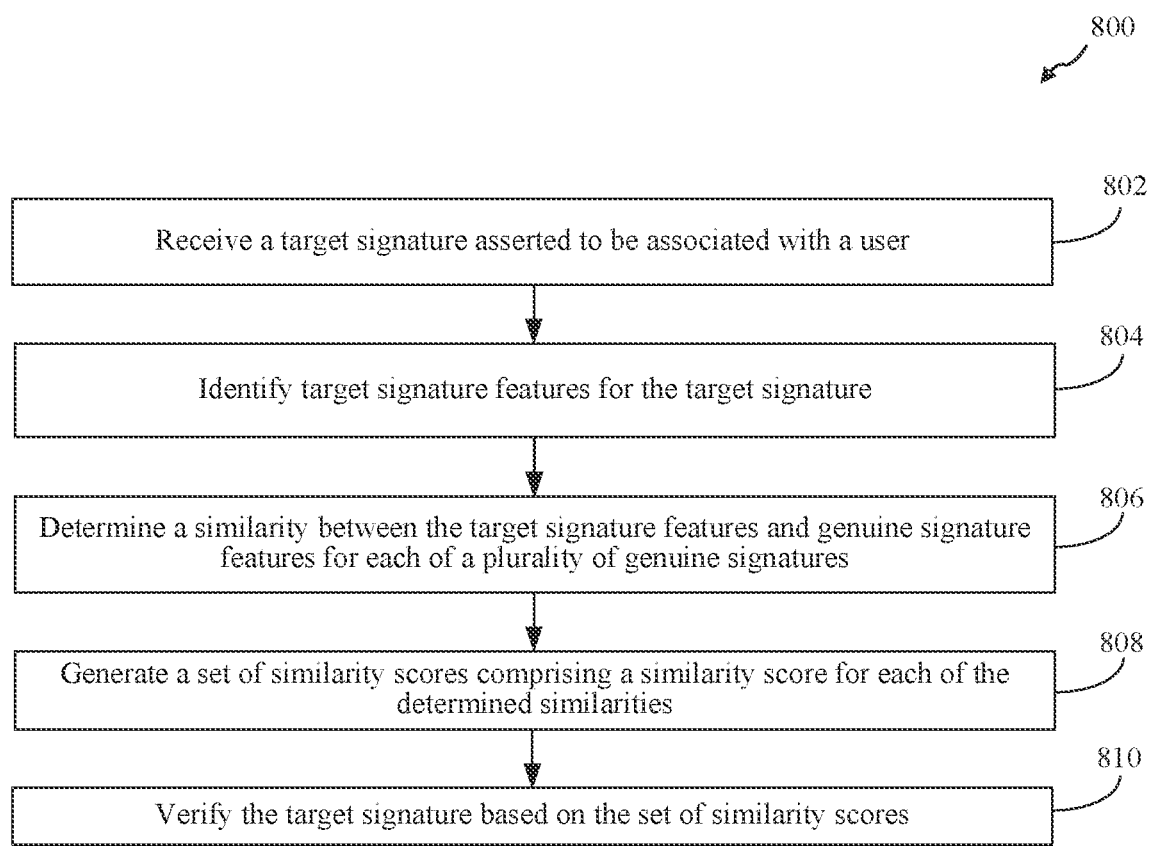
FIG. 8 shows a flowchart of a method for verifying a target signature, according to an example embodiment.

FIG. 8 shows a flowchart of a method 800 for verifying a target signature, according to an example embodiment. Embodiments disclosed herein and other embodiments may operate in accordance with example method 800. Method 800 comprises steps 802-810. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

Method 800 comprises step 802. In step 802, a target signature asserted to be associated with a user may be received. For example, as shown in FIG. 1, signature verification application 112 executed by computing device 110 may receive a signature 108 (e.g., target signature 302 or 402) from user 1 102 via signature input device 106.

In step 804, target signature features may be identified for the target signature. For example, as shown in FIGS. 3 and 4, feature extractor 310 and feature transformer 314 or TFE 408 and TFT 420 may extract target signature features for target signature 302 or 402.

In step 806, a similarity between the target signature features and genuine signature features may be determined for each of a plurality of genuine signatures. For example, as shown in FIG. 4, FNN 440 may determine a similarity between encoded target features 432 and encoded genuine signature features 446.

In step 808, a set of similarity scores (e.g., comprising a similarity score for each of the determined similarities) may be determined. For example, as shown in FIG. 4, FNN 440 may generate a set of similarity scores, with each score based on similarities determined between encoded target features 432 and encoded genuine signature features 446 for one of the plurality of genuine signatures.

In step 810, the target signature may be verified (e.g., as genuine or forged) based on the set of similarity scores. For example, as shown in FIG. 4, comparator 442 may compare each of the set of similarity scores 434 to one or more thresholds 444 to verify target signature 402 as genuine or forged.

III. Example Computing Device Embodiments

As noted herein, the embodiments described, along with any modules, components and/or subcomponents thereof (e.g., computing device 110, server(s) 122, signature verification application 112, signature verification application 124, etc.) as well as the flowcharts/flow diagrams described herein (e.g., example methods 500, 600, 700), including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
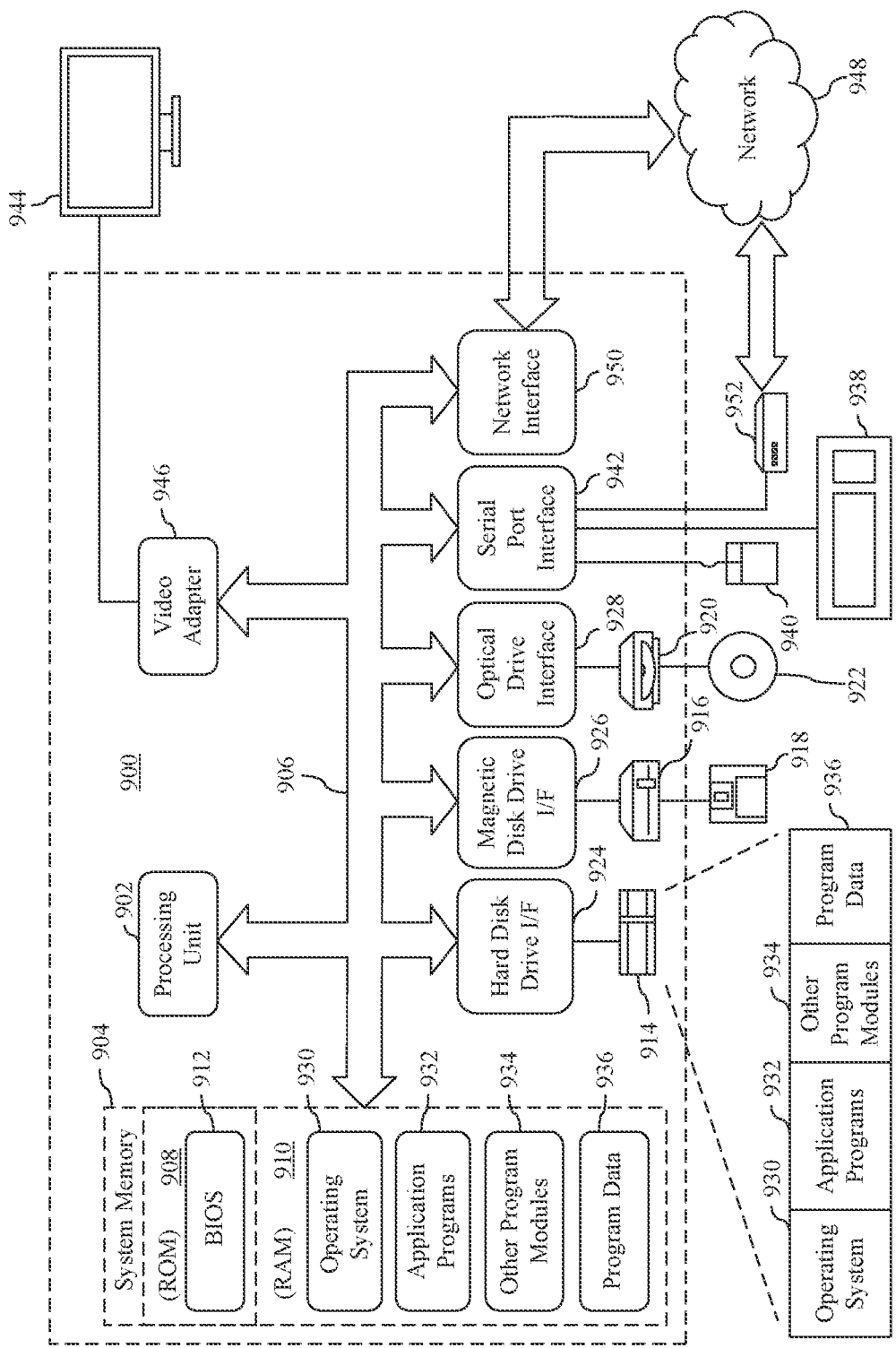
FIG. 9 shows a block diagram of an example computing device that may be used to implement example embodiments.

FIG. 9 shows an exemplary implementation of a computing device 900 in which example embodiments may be implemented. Consistent with all other descriptions provided herein, the description of computing device 900 is a non-limiting example for purposes of illustration. Example embodiments may be implemented in other types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing example embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems, and computer program products are provided for signature verification. Signature verification may be provided for target signatures using (e.g., only) genuine signatures. A signature verification model pipeline may extract (e.g., signature stroke geometry and temporal) features from a target signature and a genuine signature, encode and submit both to a neural network to generate a similarity score, which may be repeated for each genuine signature. A target signature may be classified as genuine, for example, when one or more similarity scores exceed a genuine threshold. A signature verification model may be updated or calibrated at any time with new genuine signatures. A signature verification model may be implemented with multiple trainable neural networks (e.g., for feature extraction, transformation, encoding, and/or classification).

In an example, a method (e.g., for verifying a target signature in a signature verification model pipeline), may comprise, for example, receiving, by a computing device, the target signature asserted to be associated with a user to generate a plurality of determined similarities; determining a similarity between the target signature and each genuine signature in a plurality of genuine signatures associated with the user; generating a set of similarity scores comprising a similarity score for each of the determined similarities; and verifying the target signature based on the set of similarity scores.

In an example, verifying the target signature may comprise, for example, classifying the target signature as one of genuine and forgery.

In an example, the target signature may be classified as genuine, for example, when at least one score in the set of similarity scores exceeds a genuine classification threshold.

In an example, determining the similarity between the target signature and each of a plurality of genuine signatures may comprise, for example, identifying target signature features for the target signature; identifying genuine signature features for each of the plurality of genuine signatures in the plurality of genuine signatures; and determining a similarity between the target signature features and the genuine signature features for each of the plurality of genuine signatures.

In an example, the target signature features may comprise temporal features based on timestamps associated with sample points on target signature strokes; and the genuine signature features comprise temporal features based on timestamps associated with sample points on genuine signature strokes.

In an example, the method may further comprise, for example, encoding the target signature features into encoded target features; encoding, for each of the plurality of genuine signatures, the genuine signature features into encoded genuine features; submitting as input to a neural network, for each of the plurality of genuine signatures, the encoded genuine features and the encoded target features; and generating, by the neural network, the similarity score for each of the submissions, collectively comprising the set of similarity scores.

In an example, the method may further comprise, for example, training the neural network by (e.g., for each iteration of multiple iterations of training) calculating optimality comprising a norm of gradient for each of a plurality of trainable neural networks for an iteration of training;

selecting the trainable neural network with a highest calculated optimality for the iteration of training; and updating the selected neural network for the iteration of training.

In an example, the method may further comprise, for example, receiving additional genuine signatures associated with the user; and calibrating the method with the additional genuine signatures.

In an example, a signature verification system may comprise, for example, one or more processors; and one or more memory devices that store program code configured to be executed by the one or more processors. The program code may comprise, for example, a model configured to: receive a target signature asserted to be associated with a user; generate a set of similarity scores comprising a similarity score for each genuine signature in the plurality of genuine signatures compared to the target signature; and verify the target signature based on the set of similarity scores.

In an example, the target signature may be classified as genuine, for example, when one or more scores in the set of similarity scores exceeds a genuine classification threshold.

In an example, the model may comprise, for example, a feature extractor configured to: identify target signature features for the target signature; and identify genuine signature features for each of the plurality of genuine signatures in the plurality of genuine signatures.

In an example, the target signature features may comprise temporal features based on timestamps associated with sample points on target signature strokes; and the genuine signature features may comprise temporal features based on timestamps associated with sample points on genuine signature strokes.

In an example, the model may further comprise, for example, an encoder configured to: encode the target signature features into encoded target features; and encode, for each of the plurality of genuine signatures, the genuine signature features into encoded genuine features.

In an example, the model may further comprise, for example, a neural network configured to: receive the encoded target features and the encoded genuine features for each of the plurality of genuine signatures; and generate the set of similarity scores comprising the similarity score for each genuine signature in the plurality of genuine signatures represented by the encoded genuine features compared to the target signature represented by the encoded target features.

In an example, the model may further comprise, for example, a trainer configured to train the neural network in multiple iterations comprising, for each iteration of training: calculate optimality comprising a norm of gradient for each of a plurality of trainable neural networks for an iteration of training; select the trainable neural network with a highest calculated optimality for the iteration of training; and update the selected neural network for the iteration of training.

In an example, a computer-readable storage medium may have program instructions recorded thereon that, when executed by a processing circuit, perform a method comprising, for example, providing, to a model, a target signature asserted to be associated with a user, and a plurality of genuine signatures associated with the user; generating, by the model, a set of similarity scores comprising a similarity score for each genuine signature in the plurality of genuine signatures relative to the target signature; and classifying the target signature as one of genuine and forgery based on the set of similarity scores.

In an example, the target signature may be classified as genuine, for example, when one or more scores in the set of similarity scores exceeds a genuine classification threshold.

In an example, the method may further comprise, for example, identifying, by the model, target signature features for the target signature; identifying, by the model, genuine signature features for each of the plurality of genuine signatures in the plurality of genuine signatures; and generating, by the model, the set of similarity scores based on the target signature features and the genuine signature features.

In an example, the target signature features may comprise temporal features based on timestamps associated with sample points on target signature strokes; and the genuine signature features comprise temporal features based on timestamps associated with sample points on genuine signature strokes.

In an example, the method may further comprise, for example, encoding, by the model, the target signature features into encoded target features; encoding, by the mode, the genuine signature features into encoded genuine features for each of the plurality of genuine signatures; and generating, by the model, the set of similarity scores based on the encoded genuine features and the encoded target features.

In an example, the model may generate the set of similarity scores using a trainable neural network.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A signature verification system, comprising:
   a processor; and
   a memory device that stores program code for execution by the processor, the program code comprising:
   a model comprising a chain of long short term memory (LSTM) cells, the chain comprising a first LSTM cell and a plurality of subsequent LSTM cells, wherein the model:
   transforms target signature features of a target signature into an encoded target feature matrix comprising:
   a first column corresponding to a first input of the target signature at a first timestamp, and
   a second column corresponding to a second input of the target signature at a second timestamp;
   utilizes the chain of LSTM cells to
   transform the encoded target feature matrix into an encoded target feature vector by:
   utilizing the first LSTM cell to transform the first column into a first target feature vector, and
   utilizing a last LSTM cell in the plurality of subsequent LSTM cells to transform the second column into the encoded target feature vector based on an output of a previous LSTM cell in the chain of LSTM cells; and
   verifies the target signature based on the encoded target feature vector and an encoded genuine feature vector generated based on the chain of LSTM cells and a first genuine signature.

2. The signature verification system of claim 1, wherein to transform the identified target signature features into an encoded target feature matrix, the model: transforms the target signature features into an encoded target feature tensor; and transforms the encoded target feature tensor into the encoded target feature matrix.

3. The signature verification system of claim 1, wherein the plurality of subsequent LSTM cells further comprises the previous LSTM cell, wherein the model utilizes the previous LSTM cell to:
transform a third column of the encoded target feature matrix into a second target feature vector, the third column corresponding to a third input of the target signature at a third timestamp subsequent to the first timestamp and prior to the second timestamp.

4. The signature verification system of claim 3, wherein each LSTM cell in the chain of LSTM cells preceding the last LSTM cell provides a trajectory of previous stroke points to a respective subsequent LSTM cell.

5. The signature verification system of claim 1, wherein to verify the target signature, the model:
generates a similarity score indicating a similarity between the encoded target feature vector and the encoded genuine feature vector; and
determines the similarity score satisfies a genuine classification threshold.

6. The signature verification system of claim 1, wherein to verify the target signature, the model:
generates a set of similarity scores comprising, for each of a plurality of encoded genuine feature vectors comprising the encoded genuine feature vector, each encoded genuine feature vector corresponding to a respective genuine signature, a similarity score indicating a similarity between the encoded target feature vector and the corresponding encoded genuine feature vector; and
for each similarity score of the set of similarity scores, compares the similarity score to a respective genuine classification threshold associated with a respective genuine signature.

7. The signature verification system of claim 1, wherein the chain of LSTM cells comprises:
a first sub-chain of LSTM cells configured to generate the encoded target feature vector based at least on the encoded target feature matrix, the first sub-chain of LSTM cells comprising the first LSTM cell and the plurality of subsequent LSTM cells; and
a second sub-chain of LSTM cells configured to generate the encoded genuine feature vector based at least on genuine signature features of the first genuine signature.

8. A method comprising:
transforming target signature features of a target signature into an encoded target feature matrix comprising:
a first column corresponding to a first input of the target signature at a first timestamp, and
a second column corresponding to a second input of the target signature at a second timestamp;
utilizing a chain of long short term memory (LSTM) cells to transform the encoded target feature matrix into an encoded target feature vector by:
utilizing a first LSTM cell in the chain to transform the first column into a first target feature vector, and
utilizing a last LSTM cell in a plurality of LSTM cells subsequent to the first LSTM cell to transform the second column into the encoded target feature vector based on an output of a previous LSTM cell in the chain; and verifying the target signature is genuine based on the encoded target feature vector and an encoded genuine feature vector generated based at least on the chain of LSTM cells and a first genuine signature.

9. The method of claim 8, wherein said transforming the identified target signature features into an encoded target feature matrix comprises:
transforming the target signature features into an encoded target feature tensor; and
transforming the encoded target feature tensor into the encoded target feature matrix.

10. The method of claim 8, wherein said utilizing the chain to transform the encoded target feature matrix into the encoded target feature vector further comprises:
utilizing the previous LSTM cell to transform a third column of the encoded target feature matrix into a second target feature vector, the third column corresponding to a third input of the target signature at a third timestamp subsequent to the first timestamp and prior to the second timestamp.

11. The method of claim 8, wherein said verifying the target signature is genuine comprises:
generating a similarity score indicating a similarity between the encoded target feature vector and an encoded genuine feature vector corresponding to a genuine signature; and
determining the similarity score satisfies a genuine classification threshold.

12. The method of claim 8, wherein said verifying the target signature is genuine comprises:
generating a set of similarity scores comprising, for each of a plurality of encoded genuine vectors, each encoded genuine feature vector corresponding to a respective genuine signature, a similarity score indicating a similarity between the encoded target feature vector and the corresponding encoded genuine feature vector; and
for each similarity score of the set of similarity scores, comparing the similarity score to a respective genuine classification threshold associated with a respective genuine signature.

13. The method of claim 8, further comprising:
training a plurality of neural networks by:
for each iteration of multiple iterations of training:
calculating a norm of gradient for each of the plurality of neural networks;
selecting a neural network of the plurality of neural networks with a highest calculated optimality;
updating the selected neural network while leaving other neural networks of the plurality of neural networks unchanged.

14. A computer-readable storage medium having program instructions recorded thereon that, when executed by a processing circuit, perform a method comprising:
transforming target signature features into an encoded target feature matrix comprising:
a first column corresponding to a first input of the target signature at a first timestamp, and
a second column corresponding to a second input of the target signature at a second timestamp;
utilizing a chain of long short term memory (LSTM) cells to transform the encoded target feature matrix into an encoded target feature vector by:
utilizing a first LSTM cell in the chain to transform the first column into a first target feature vector, and
utilizing a last LSTM cell in a plurality of LSTM cells subsequent to the first LSTM cell to transform the second column into the encoded target feature vector based on an output of a previous LSTM cell in the chain; and verifying the target signature is genuine based on the encoded target feature vector and an encoded genuine feature vector generated based at least on the chain of LSTM cells and a first genuine signature.

15. The computer-readable storage medium of claim 14, wherein said transforming the identified target signature features into an encoded target feature matrix comprises:

transforming the target signature features into an encoded target feature tensor; and transforming the encoded target feature tensor into the encoded target feature matrix.

16. The computer-readable storage medium of claim 14, wherein said utilizing the chain to transform the encoded target feature matrix into the encoded target feature vector further comprises:

utilizing the previous LSTM cell to transform a third column of the encoded target feature matrix into a second target feature vector, the third column corresponding to a third input of the target signature at a third timestamp subsequent to the first timestamp and prior to the second timestamp.

17. The computer-readable storage medium of claim 14, wherein said verifying the target signature is genuine comprises:

generating a similarity score indicating a similarity between the encoded target feature vector and an encoded genuine feature vector corresponding to a genuine signature; and determining the similarity score satisfies a genuine classification threshold.

18. The computer-readable storage medium of claim 14, wherein said verifying the target signature is genuine comprises:

generating a set of similarity scores comprising, for each of a plurality of encoded genuine vectors, each encoded genuine feature vector corresponding to a respective genuine signature, a similarity score indicating a similarity between the encoded target feature vector and the corresponding encoded genuine feature vector; and for each similarity score of the set of similarity scores, comparing the similarity score to a respective genuine classification threshold associated with a respective genuine signature.

19. The computer-readable storage medium of claim 14, wherein the method further comprises:

training a plurality of neural networks by:
  for each iteration of multiple iterations of training:
    calculating a norm of gradient for each of the plurality of neural networks;
    selecting a neural network of the plurality of neural networks with a highest calculated optimality;
updating the selected neural network while leaving other neural networks of the plurality of neural networks unchanged.

20. The method of claim 8, wherein:

the chain of LSTM cells comprises:
  a first sub-chain of LSTMs comprising the first LSTM cell and the plurality of subsequent LSTM cells, and
  a second sub-chain of LSTM cells; and the method further comprises:
  utilizing the second sub-chain of LSTM cells to generate the encoded genuine feature vector based at least on genuine signature features of the first genuine signature.

\* \* \* \* \*